United States Patent
Wu

(10) Patent No.: US 9,500,802 B2
(45) Date of Patent: Nov. 22, 2016

(54) DISPLAY APPARATUS

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 5 days.

(21) Appl. No.: 14/472,224

(22) Filed: Aug. 28, 2014

(65) Prior Publication Data

US 2015/0369995 A1 Dec. 24, 2015

(30) Foreign Application Priority Data

Jun. 20, 2014 (CN) .......................... 2014 1 0280894

(51) Int. Cl.
G02B 6/10 (2006.01)
F21V 8/00 (2006.01)

(52) U.S. Cl.
CPC ............. *G02B 6/009* (2013.01); *G02B 6/0036* (2013.01); *G02B 6/0043* (2013.01)

(58) Field of Classification Search
CPC ..... F21V 7/04; F21V 2200/20; G02B 6/009; G02B 6/0016; G02B 6/0043; G02B 6/0065
USPC ........................................................ 362/609
See application file for complete search history.

(56) References Cited

U.S. PATENT DOCUMENTS

| | | | | |
|---|---|---|---|---|
| 2003/0214616 A1* | 11/2003 | Komoto | ............... | G02B 6/0023 349/96 |
| 2006/0050535 A1* | 3/2006 | Chang | ................. | G02B 6/0023 362/621 |
| 2006/0092669 A1* | 5/2006 | Chen | .................... | G02B 6/0025 362/619 |
| 2007/0230215 A1* | 10/2007 | Chang | ................. | G02B 6/0021 362/613 |
| 2008/0002433 A1* | 1/2008 | Jung | .................... | G02B 6/0016 362/625 |
| 2009/0021959 A1* | 1/2009 | Yoshikawa | .......... | G02B 6/0025 362/609 |

FOREIGN PATENT DOCUMENTS

| | | |
|---|---|---|
| CN | 1928662 A | 3/2007 |
| CN | 101140335 A | 3/2008 |
| CN | 102236203 A | 11/2011 |
| CN | 202364414 U | 8/2012 |
| JP | H11295714 A | 10/1999 |
| JP | 2001043713 A | 2/2001 |

OTHER PUBLICATIONS

Chinese Office Action with English translation dated Dec. 1, 2015, for corresponding Chinese Application No. 201410280894.4.

* cited by examiner

*Primary Examiner* — Nimeshkumar Patel
*Assistant Examiner* — Christopher Raabe
(74) *Attorney, Agent, or Firm* — Kinney & Lange, P.A.

(57) ABSTRACT

A display apparatus is provided. It comprises a display panel and a switching assembly comprising a transparent light guide plate located at the light incidence side of the display panel and a light source, the transparent light guide plate located at the light incidence side of the display panel and provided with a plurality of mesh points on the surface of the transparent light guide plate facing away from the display panel, the transparent light guide plate having a light incidence face, the light source being located at one side of the light incidence face of the transparent light guide plate and being switchable between one state in which the light is emitted towards the light incidence face of the transparent light guide plate and the other state in which the light is not emitted towards the light incidence face of the transparent light guide plate.

12 Claims, 2 Drawing Sheets

DISPLAY APPARATUS

CROSS-REFERENCE TO RELATED APPLICATION

This application claims the benefit of Chinese Patent Application No. 201410280894.4 filed on Jun. 20, 2014 in the State Intellectual Property Office of China, the disclosure of which is incorporated in entirety herein by reference.

BACKGROUND OF THE INVENTION

Field of the Invention
The present disclosure relates to a display apparatus.
Description of the Related Art
In the technical field of transparent display, when the display apparatus performs a transparent display, an observer may not only the content displayed on the display panel of the display apparatus, but also see the material object behind the display panel of the display apparatus through the display panel.

However, in practice, it often needs the display apparatus to be switchable between the transparent display and non-transparent display, i.e., the display apparatus can provide a transparent display when it is needed, otherwise, it can provide a normal display.

In view of the above, it is desired to provide a display apparatus which can be switched between the transparent display and non-transparent display.

SUMMARY OF THE INVENTION

In view of the above and other problems in the prior, an embodiment of the present invention provides a display apparatus which can be switched between the transparent display and non-transparent display.

According to an embodiment of the present invention, it provides a display apparatus, the display apparatus comprises:

a display panel and a switching assembly located at the light incidence side of the display panel, the switching assembly comprising a transparent light guide plate and a light source, wherein the transparent light guide plate is located at the light incidence side of the display panel and is provided with a plurality of mesh points on the surface of the transparent light guide plate facing away from the display panel, the transparent light guide plate having a light incidence face connecting a face facing away from the display panel and the other face facing towards the display panel laterally, the light source being located at one side of the light incidence face of the transparent light guide plate and being switchable between one state in which the light is emitted towards the light incidence face of the transparent light guide plate and the other state in which the light is not emitted towards the light incidence face of the transparent light guide plate.

In the above display apparatus, the state in which the light is not emitted towards the light incidence face of the transparent light guide plate means the state in which the light is not emitted from the light source, or the state in which the light source emits the light, but the emitted light does not travel towards the light incidence face of the transparent light guide plate.

In the above display apparatus, when the display apparatus needs to provide a transparent display, the light source becomes the state in which the light is not emitted towards the light incidence face of the transparent light guide plate.

At that time, the light from the side of the transparent light guide plate facing away from the display panel is prominent in the light transmitted through the display panel and the observer at the light exiting side of the display panel may see the material object behind the display apparatus to provide a transparent display. When the display apparatus needs to provide a non-transparent display, the light source becomes the state in which the light is emitted towards the light incidence face of the transparent light guide plate. The light emitted towards the light incidence face of the transparent light guide plate enters the transparent light guide plate from the light incidence face of the transparent light guide plate and is directed to the display panel after being scattered by the mesh points. At that time, the light which is emitted from the light incidence face of the transparent light guide plate, enters the transparent light guide plate and travels towards the display panel after being scattered by the mesh points of the transparent light guide plate, is prominent in the light transmitted through the display panel such that the observer cannot see clearly the material object behind the display apparatus to provide a non-transparent display.

Therefore, the above display apparatus may be switched between the transparent display and the non-transparent display.

According to an embodiment of the present invention, it provides display apparatus comprising: a display panel; a transparent light guide plate arranged on a light incidence side of the display panel; and a light source configured to emit light onto the transparent light guide plate, or not.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
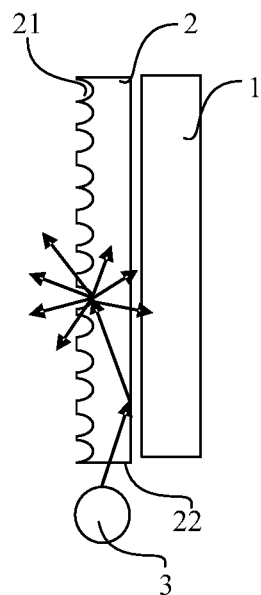
FIG. 1 is a schematic view showing a structure of a display apparatus according to an embodiment of the present invention.

The embodiments of the present invention will be further explained below with reference to the figures and examples. The following embodiments are only explained by way of examples, instead of being intended to limit the scope of the present invention.

In accordance with a general invention concept of the present disclosure, a display apparatus is provided, and the display apparatus comprises:

a display panel and a switching assembly located at the light incidence side of the display panel, the switching assembly comprising a transparent light guide plate and a light source, wherein the transparent light guide plate is located at the light incidence side of the display panel and is provided with a plurality of mesh points on the surface of the transparent light guide plate facing away from the display panel, the transparent light guide plate having a light incidence face connecting a face facing away from the display panel and the other face facing towards the display panel laterally, the light source being located at one side of the light incidence face of the transparent light guide plate and being switchable between one state in which the light is emitted towards the light incidence face of the transparent light guide plate and the other state in which the light is not emitted towards the light incidence face of the transparent light guide plate.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view showing a structure of a display apparatus according to an embodiment of the present invention.

As illustrated in FIG. 1, an embodiment of the present invention provides a display apparatus comprising a display panel 1 and a switching assembly located at the light incidence side of the display panel 1, the switching assembly comprises a transparent light guide plate 2 and a light source 3.

The transparent light guide plate 2 is located at the light incidence side of the display panel and is provided with a plurality of mesh points 21 on the surface of the transparent light guide plate 2 facing away from the display panel 1, the transparent light guide plate has a light incidence face 22 connecting a face facing away from the display panel 1 and the other face facing towards the display panel laterally, the light source 3 is located at one side of the light incidence face 22 of the transparent light guide plate 2 and is switchable between one state in which the light is emitted towards the light incidence face 22 of the transparent light guide plate 2 and the other state in which the light is not emitted towards the light incidence face 22 of the transparent light guide plate 2.

In the above display apparatus, the state of the light source 3 in which the light is not emitted towards the light incidence face 22 of the transparent light guide plate 2 means the state in which the light is not emitted from the light source 3, or the state in which the light source 3 emits the light, but the emitted light does not travel towards the light incidence face 22 of the transparent light guide plate 2.

In the above display apparatus, when the display apparatus needs to provide a transparent display, the light source 3 becomes the state in which the light is not emitted towards the light incidence face 22 of the transparent light guide plate 2. At that time, the light from the side of the transparent light guide plate 2 facing away from the display panel 1 is prominent in the light transmitted through the display panel 1 and the observer at the light exiting side of the display panel 1 may see the material object behind the display apparatus to provide a transparent display. When the display apparatus needs to provide a non-transparent display, the light source 3 becomes the state in which the light is emitted towards the light incidence face 22 of the transparent light guide plate 2. The light emitted from the light source 3 towards the light incidence face 22 of the transparent light guide plate 2 enters the transparent light guide plate 2 from the light incidence face 22 of the transparent light guide plate 2 and is directed to the display panel 1 after being scattered by the mesh points 21. At that time, the light which is emitted from the light incidence face 22 of the transparent light guide plate 2, enters the transparent light guide plate 2 and travels towards the display panel 1 after being scattered by the mesh points 21 of the transparent light guide plate 2, is prominent in the light transmitted through the display panel 1 such that the observer cannot see clearly the material object behind the display apparatus to provide a non-transparent display.

Therefore, the above display apparatus may be switched between the transparent display and the non-transparent display.

In addition, in the switching assembly of the above display apparatus, the switching of the display apparatus between the transparent display and the non-transparent display may be achieved only by cooperation of the transparent light guide plate 2 and the light source 3. Thus, the switching assembly has a simplified structure.

In accordance with an embodiment of the present invention, as shown in FIG. 1, each of the mesh points 21 is a recess formed on the surface of the transparent light guide plate 2 facing away from the display panel 1; or each of the mesh points 21 is a scattering particle formed on the surface of the transparent light guide plate 2 facing away from the display panel 1.

In accordance with an embodiment of the present invention, each of the mesh points 21 has a size in nano-scale. And the distance between any two adjacent mesh points 21 is also in nano-scale. In particular, the distance between any two adjacent mesh points is 5~100 nm, for example, 5 nm, 10 nm, 20 nm, 30 nm, 40 nm, 50 nm, 55 nm, 60 nm, 70 nm, 80 nm, 90 nm, 95 nm, 100 nm.

Figure 3:
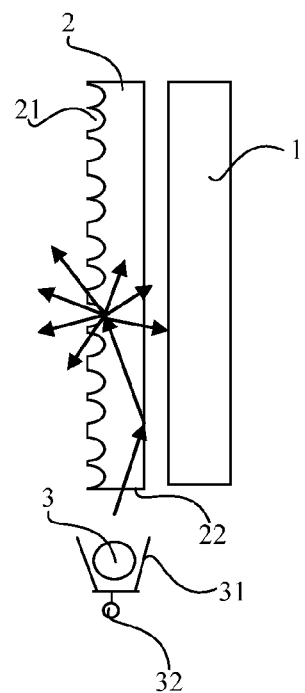
FIG. 3 is a schematic view showing the principle of non-transparent display of the display apparatus according to an embodiment of the present invention.
Figure 4:
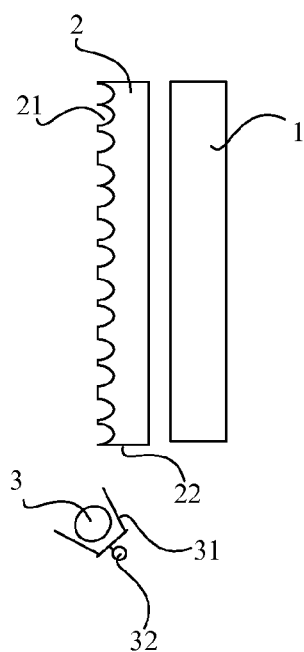
FIG. 4 is a schematic view showing the principle of transparent display of the display apparatus shown in FIG. 3.

As shown in FIGS. 3-4, according to another embodiment of the present invention, the above display apparatus further includes a fixing bracket on which the display panel 1 and the switching assembly are both mounted.

In accordance with another embodiment of the present invention, the above display apparatus further includes: a concentrating cover 31 on which the light source 3 is mounted, the concentrating cover 31 being mounted pivotally on the fixing bracket via a rotating shaft 32, the rotating shaft 32 having an axis parallel to the light incidence face of the display panel 1 and the light incidence face 22 of the transparent light guide plate 2. As shown in FIG. 3, the concentrating cover 31 has a light outlet facing the light incidence face 22 of the transparent light guide plate 2, and as illustrated in FIG. 4, the concentrating cover 31 is rotatable about the rotating shaft 32 to open towards the side of the transparent light guide plate 2 facing away from the display panel 1.

The light source 3 emits the light from an opening of the concentrating cover 31. When the light outlet of the concentrating cover 31 faces the light incidence face 22 of the transparent light guide plate 2, the light directed by the concentrating cover 31 from the light source 3 enters the light incidence face 22 of the transparent light guide plate 2 such that the display apparatus provides the non-transparent display. When the concentrating cover 31 rotates about the rotating shaft 32 to open towards the side of the transparent light guide plate 2 facing away from the display panel 1, the light directed by the concentrating cover 31 from the light source 3 is irradiated on the material object on the back side of the display apparatus to improve the brightness of the material object. At that time, the display apparatus achieves the transparent display and the brightness of the material object behind the display apparatus seen by the observer is relative high.

Figure 2:
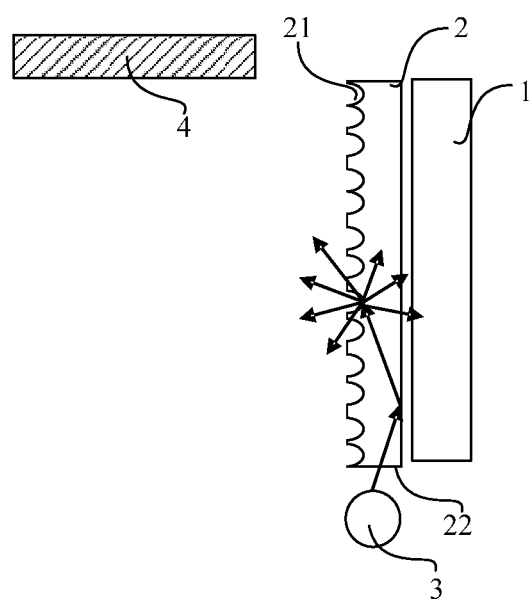
FIG. 2 is a schematic view showing a structure of a display apparatus according to another embodiment of the present invention.

As illustrated in FIG. 2, in view of the above embodiments, in order to improve the brightness of the material object behind the display apparatus seen by the observer, in the display apparatus, the above display apparatus further includes: an illuminating light source 4 mounted on the fixing bracket and located on the side of the transparent light guide plate 2 away from the display panel 1. When the transparent display is performed, the light emitted from the light source 3 does not travel towards the light incidence face 22 of the transparent light guide plate 2, but travels towards the material object behind the display apparatus. It may further improve the brightness of the material object behind the display apparatus seen by the observer.

As an example, when the display apparatus provides the non-transparent display, the illuminating light source 4 may not emit the light, and but reduce the intensity of the light reflected by the material object at the side of the transparent light guide plate 2 facing away from the display panel 1 towards the display panel 1 so as to improve the display effects of the display apparatus when it performs the non-transparent display.

In accordance with an embodiment of the present invention, the illuminating light source 4 may be a surface light source.

In accordance with an embodiment of the present invention, the transparent light guide plate 2 is a glass plate or an acrylic plate.

In accordance with an embodiment of the present invention, in order to improve the display effects of the display apparatus when it performs the non-transparent display, the distance between the light incidence face of the display panel 1 and the face of the transparent light guide plate 2 facing the display panel is 0.5 mm~20 mm. As an example, an air layer is filled between the light incidence face of the display panel 1 and the face of the transparent light guide plate 2 facing the display panel 1. Provision of the air layer may improve atomization effects of the display apparatus at the transparent light guide plate when it provides the non-transparent display so as to improve the display effects of the display apparatus for the non-transparent display. In accordance with an embodiment of the present invention, the display panel 1 may be a liquid crystal panel (LCD), an organic light emitting display panel (OLED), an electrowetting display panel (EWD) or an electrochromic display panel (ECD).

In accordance with an embodiment of the present invention, it provides a display apparatus comprising: a display panel; a transparent light guide plate arranged on a light incidence side of the display panel; and a light source configured to emit light onto the transparent light guide plate, or not.

In accordance with another embodiment of the present invention, as a variant of the embodiment shown in FIG. 3, the concentrating cover 31 is replaced by a rotating member on which the light source is arranged. The rotating member is arranged such that, when it rotates, the light emitted from the light source is irradiated onto the transparent light guide plate, or not.

Although several exemplary embodiments have been shown and described, the present invention is not limited to those and it would be appreciated by those skilled in the art that various changes or modifications may be made in these embodiments without departing from the principles and spirit of the disclosure, which should fall within the scope of the present invention. The scope of the invention is defined in the claims and their equivalents.

What is claimed is:

1. A display apparatus comprising
  a display panel and a switching assembly located at a light incidence side of the display panel, the switching assembly comprising a transparent light guide plate and a light source;
  a fixing bracket on which the display panel and the switching assembly are both mounted,
  wherein the transparent light guide plate is located at the light incidence side of the display panel and is provided with a plurality of mesh points on a surface of the transparent light guide plate facing away from the display panel, the transparent light guide plate having a light incidence face connecting a face facing away from the display panel and another face facing towards the display panel laterally, the light source being located at one side of the light incidence face of the transparent light guide plate and being switchable between one state in which light is emitted towards the light incidence face of the transparent light guide plate and another state in which light is not emitted towards the light incidence face of the transparent light guide plate; and
  wherein the display apparatus further includes a concentrating cover on which the light source is mounted, the concentrating cover being mounted pivotally on the fixing bracket via a rotating shaft, the rotating shaft having an axis parallel to the light incidence side of the display panel and the light incidence face of the transparent light guide plate, the concentrating cover having a light outlet facing the light incidence face of the transparent light guide plate, and wherein the concentrating cover is rotatable about the rotating shaft to open towards a side of the transparent light guide plate facing away from the display panel.

2. The display apparatus according to claim 1, wherein each of the mesh points is a recess formed on the surface of the transparent light guide plate facing away from the display panel;
  or each of the mesh points is a scattering particle formed on the surface of the transparent light guide plate facing away from the display panel.

3. The display apparatus according to claim 2, wherein the distance between any two adjacent mesh points is 5~100 nm.

4. The display apparatus according to claim 1, further comprising:
  an illuminating light source mounted on the fixing bracket and located on the side of the transparent light guide plate away from the display panel.

5. The display apparatus according to claim 4, wherein the illuminating light source is a surface light source.

6. The display apparatus according to claim 1, wherein the transparent light guide plate is a glass plate or an acrylic plate.

7. The display apparatus according to claim 1, wherein the distance between the light incidence face of the display panel and the face of the transparent light guide plate facing the display panel is 0.5 mm~20 mm.

8. The display apparatus according to claim 1, wherein the display panel is: a liquid crystal panel (LCD), an organic light emitting display panel (OLED), an electrowetting display panel (EWD) or an electrochromic display panel (ECD).

9. A display apparatus comprising:
  a display panel;
  a transparent light guide plate arranged on a light incidence side of the display panel;

- a light source configured to selectively emit light onto the transparent light guide plate; and
- a rotating member on which the light source is arranged, the rotating member being arranged such that, when it rotates, the light emitted from the light source is switchable between a first state in which the light is irradiated onto the transparent light guide plate, and a second state in which the light is not irradiated onto the transparent light guide plate.

10. The display apparatus according to claim 9, wherein the transparent light guide plate comprises a first surface which faces the light incidence side of the display panel and a second surface which faces away from the light incidence side of the display panel, the second surface being provided with recesses or scattering particles.

11. The display apparatus according to claim 10, further comprising an illuminating light source arranged at a lateral side of the second surface of the transparent light guide plate.

12. The display apparatus according to claim 10, wherein the transparent light guide plate further comprises a third surface connecting the first surface with the second surface, the light emitted from the light source entering the transparent light guide plate from the third surface.

* * * * *